INVENTORS
WERNER MIALKI
RUDOLF WILLE

BY

Nolte & Nolte
ATTORNEYS

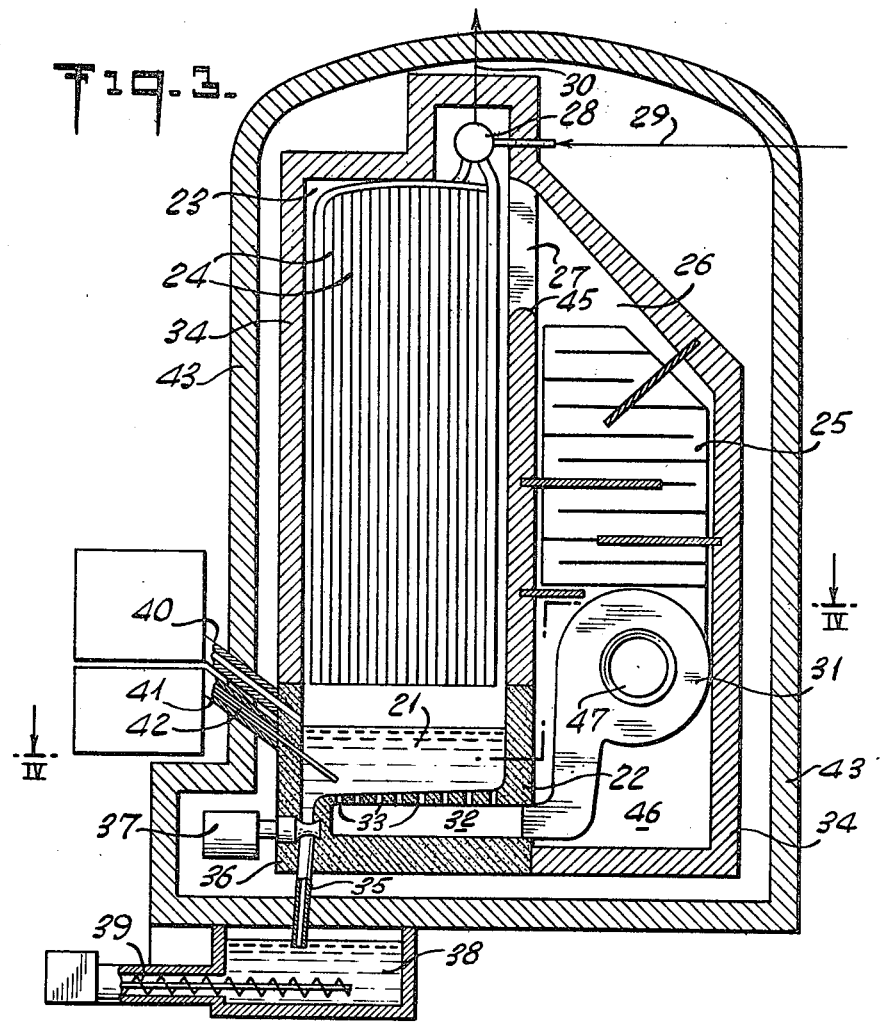
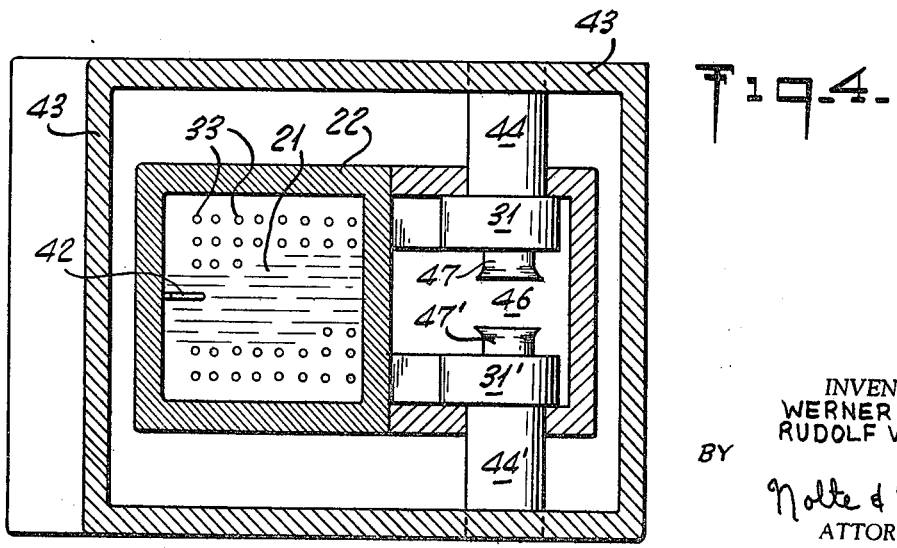

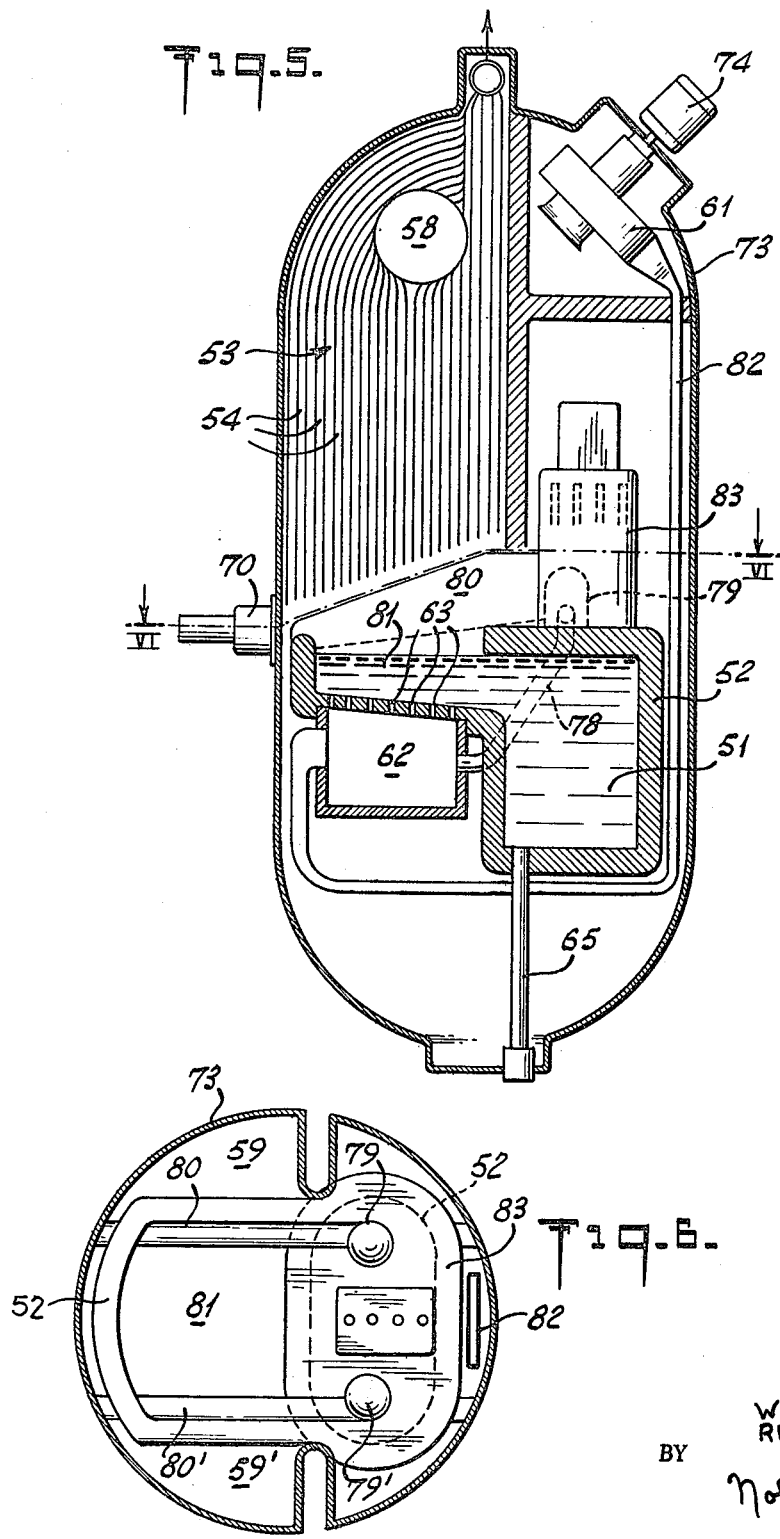

INVENTORS
WERNER MIALKI
RUDOLF WILLE
BY Nolte & Nolte
ATTORNEYS

3,494,829
HOMOGENEOUS, THERMAL NUCLEAR FISSION REACTOR

Werner Mialki, Holbeinstrasse 69a, Berlin-Lichterfelde, and Rudolf Wille, Freiherr-von-Stein-Strasse 11a, Berlin-Schoneberg, both of Germany
Continuation-in-part of application Ser. No. 432,324, Feb. 12, 1965. This application Oct. 23, 1967, Ser. No. 679,964
Claims priority, application Germany, Jan. 13, 1962, M 51,443
Int. Cl. G21c 3/04
U.S. Cl. 176—46
10 Claims

ABSTRACT OF THE DISCLOSURE

In a homogeneous, thermal nuclear fission reactor there is provided a diathermanous solution of a fissionable material and a moderator substance in a molten oxyceramic composition which forms a glass when congealed or a molten mixture of metal oxides, thus permitting the reactor to operate at temperatures in excess of 1000° C.

---

This application is a continuation-in-part of copending application Ser. No. 432,324, now abandoned, filed Feb. 12, 1965, the latter being a continuation-in-part of now abandoned application Ser. No. 169,214, filed Jan. 29, 1962.

The present invention deals with homogeneous, thermal fission reactors, and more particularly with reactors permitting the utilization of very high temperatures, in which the fuel and the moderator are dissolved in a diathermanous mixture, viz. an oxyceramic or metal oxide mixture melt.

In nuclear fission reactors, one of the principal difficulties encountered is the problem of controlling the high temperatures involved. In particular, it is not possible to utilize the reactors as sources of energy in the thermal zone between 1000 and 2000° C. Known homogeneous reactors utilizing aqueous or metallic fissionable fuel solutions cannot be taken into consideration for the above temperature range at all. Known heterogeneous reactors in which the fissionable materials are used in an oxide or carbide linkage with envelopes around the elements, e.g. of graphite or ceramic materials, also reach temperatures up to 1000° C. only. Although the fuel elements may reach temperatures exceeding 1000° C., these temperatures cannot be put to use in the reactor.

It is the object of the present invention to provide a homogeneous, thermal nuclear fission reactor which permits utilizing temperatures exceeding 1000° C., e.g. those between 1000 and 2000° C., and thus to exploit efficiently any temperature level as long as it is practically manageable and economical.

It is a major feature of the invention that the inventive reactor contains a melt wherein a fissionable material, e.g. uranium dioxide, and a moderator, e.g. beryllium oxide, are dissolved.

According to a preferred first embodiment of the invention, an oxyceramic melt is used as a diathermanous carrier medium in which fuel and moderator are dissolved to form a diathermanous composition. In congealed condition, the melt forms a glass.

Various melts, e.g. borate melts of the $^{11}B$ isotone, and silica melts (about 50 to 60 mol percent $^{11}B_2O_3$ or $SiO_2$) with aluminum oxide ($Al_2O_3$), magnesium oxide (MgO) and lithium oxide ($Li_2O$) of the $^7Li$ isotope, are suitable for this purpose. Detailed examples will be given somewhat later in the specification.

Owing to the known diathermanous properties of oxyceramic melts, forming a glass in congealed condition, a heat flux of extremely high energy density emanates therefrom. This heat flux is due to internal heat radiation and convection.

It has been found that not only oxyceramic melts but also other mixtures of metallic oxides may be used which are equivalents of the former as concerns transmittal of heat when in liquid state.

Thus, according to a second embodiment of the invention, mixtures of suitable metal oxides, e.g. magnesium oxide, aluminum oxide, zirconium oxide, etc. may be used as long as they bring about, in their liquid state. the formation of a diathermanous mixture with the fissionable fuels, e.g. uranium dioxide, and the moderators, preferably beryllium oxide, dissolved therein.

By way of example of a composition in a melt of which the fissionable fuels may be dissolved according to the invention, a mixture of the following composition may be given: 44.45 mol percent BeO, 11.1 mol percent $Al_2O_3$ and 44.45 mol percent MgO. In this example, BeO is the moderator. Thus, to speak of the moderator and the fissionable fuel as being dissolved in a molten oxyceramic composition or a molten mixture of metal oxides is not intended as a limitation with respect to the method in which the compositions are prepared. Further details will be given in the detailed specification which follows:

According to the invention, any mixture of metallic oxides may be used beside the exemplary mixture mentioned hereinabove as long as these oxides are useful, from the point of view of neutron economy, in the absorption cross-sectional area and as long as they yield, in their molten, liquid state, a diathermanous mixture.

By increasing the number of the components, the fusing point of the solution can be reduced. In this manner, solutions may be obtained which remain in liquid state at temperatures between 1000 and 2200° C. and above.

The solution can be contained in a steel tank which is cooled in a known manner. In one specific embodiment of the invention, representing a power-plant reactor, a coolant, water, for instance, can be made to flow through pipe sections welded to the tank. The water is, in this case, preheated as in an economizer of a conventional steam boiler. According to the temperatures admissible for the material of the tank and the melting temperature of the solution employed, the melt in the neighborhood of the tank wall can either still be in a liquid state or in a solidified or congealed condition. The melt can thus still be liquid in the proximity of the tank wall, or it may already have solidified, i.e., the mixture is transformed from a liquid state in the center to a solid state toward the outer tank peripheries.

The solid layer at the tank wall will then form a complete protection against possible corrosion of the liquid melt. This expedient has been exploited for quite some time in the ceramic industry (e.g. with agitators in melting pots) and in chemical manufacture (enameling as a protection against corrosion).

The composition of the solution in both the liquid and the solid zone undergoes changes during reactor operation, owing to the consumption of the fissionable substance. A differential composition in said zone can, however, a priori be provided for reasons of neutron physics, heat technology or other. So, for instance, the composition in the solid zone can be selected in such a manner as to be permeable or impermeable to thermal radiation.

The heat generated through nuclear fission can, apart from being partly led off by the walls of the tank, preferably be derived for further use through radiation exchange of the free surfaces with tube walls disposed above same, similarly to the process in a combustion chamber of a high-pressure steam boiler.

The heat transfer within the solution to the exothermal wall will preferably take place, at high temperatures, through radiation, because of the diathermanous properties of the applied ceramic oxides. Energy transfer through radiation depends on the temperature and absorption coefficient in the region. Low values of the absorption coefficient are, as it is known, characteristic for uncolored glasses and diathermanous ceramic substances in liquid, molten condition.

Since the integral mean of the absorption coefficient drops in proportion to temperature, and, furthermore, the spectral distribution of the radiation of the black body is shifted toward the shorter wave lengths at which the absorption coefficient is lower, the radiation conductivity, which represents a measure of energy transfer by radiation, increases at a rate higher than the third exponent of temperature.

With commercial glass, the radiation conductivity amounts to e.g. 0.05 cal./cm. s. ° C. at 700° C., and 0.1 cal./cm. s. ° C. at 1300° C. This behavior is more or less pronounced with all glasses and molten ceramic oxides.

Fission products produced in the solution through nuclear reaction bring about a change in the chemical composition of the solution. Impurities in molten glasses and oxyceramic melts will, as additional absorption and scattering centers, have a noticeably unfavorable influence upon the optical properties of such solutions only if they are present in relatively high concentrations. Since the residual fission-product increment is extremely small when compared to the employed amounts of fissionable substance, the concentration of the impurities can be kept at such a low level as to permit the complete disregard of its influence on the heat-transfer properties. This may be accomplished by a continuous or discontinuous removal of the used melts.

The principle of conveying the heat generated in the solution through nuclear fission to a coolant is described herein with regard to a specific embodiment of the invention, representing a power-plant reactor.

Because of the very good heat-transfer properties within the solution, mentioned hereinbefore, the achievable heat streams with the described embodiment depend substantially on the heat-transfer conditions prevailing in the border zones and outside the tank containing the solution. There are two kinds of heat transfer to be distinguished: heat radiation at the free surface of the solution, and heat conduction and convection at the solid tank walls. The data observed for the inventive embodiment will be given hereinafter.

A change in the interface temperature of the liquid solution will bring about a proportionate change in the radiation quota because of the high temperature dependence of the heat radiation. An alteration of the temperature level, on the other hand, will have only a negligible influence upon the heat transfer through the tank walls.

To intensify the convective heat transfer from the diathermanous melt and, if necessary, to homogenize the mass, the bottom and/or the walls of the tank containing the melt may be provided with openings or nozzles connected to a blower for introducing a gas into the melt. By this measure an extensive heat-radiating surface is achieved and, due to the fluid properties of the melt, the danger of local overheating (as encountered with loose materials and in waste heaps) is avoided.

The hot gas emerging from the diathermanous melt is led off into a heat exchanger or into the evaporation system of the reactor. The blowers are preferably connected on their suction side with the heat-exchanger or evaporation-system chamber so that the gas is led in a closed circuit through the melt and through the heat exchanger or the evaporation system. The blowers are preferably disposed in a separate induction chamber which follows the heat-exchanger or evaporation-system chamber.

As an alternative feature of the invention, means are provided for the partial or total freezing of the melt. In this way used-up material can be easily removed from the reactor in a frozen state. The gaseous fission products are enclosed in the frozen diathermanous mass and are trapped there so that they may be removed together with this mass.

Another feature of the invention resides in the fact that the heat released during the fission process can be utilized in an especially useful manner, inasmuch as the melt itself circulates between the reactor core and a heat-exchanger system. For this purpose the reactor core and the heat-exchanger system are interconnected by transport means for the melt, which forms a closed circuit. The liquid susbtance may be transported, for example, by introducing gases into a feed pipe containing the melt.

Other objects and many of the attendant advantages of the invention will be readily appreciated as the same becomes better understood by reference to the following detailed description, when considered with the accompanying drawings, wherein:

FIG. 3 is a sectional view similar to that of FIG. 1 of another embodiment of the inventive reactor;

FIG. 4 is a cross-sectional view similar to that of FIG. 2, taken along line IV—IV of FIG. 3;

FIG. 5 is a sectional view similar to those of FIGS. 1 and 3 of a third embodiment of the inventive reactor;

FIG. 6 is a cross-sectional view similar to those of FIGS. 2 and 4, taken along line VI—VI of FIG. 5;

Before going into the description of the preferred reactor embodiments according to the invention, details reactor according to the invention, details will be given of the typical molten fuels that can be used in the reactors.

By way of example, the following compositions are given for a borate and a silica melt in which fissionable substance can be dissolved, e.g. $UO_2$ enriched by for example, 20% by weight of the isotope 235-U, and with which a critical multiplication factor $K \setminus 1$ can be attained even at low fission substance concentration values, such as 0.5 to 3% by weight.

(1) Borate melt: Mol percent
$^{11}B_2O_3$ ---------------------------------- 45
MgO ---------------------------------------- 35
BeO ----------------------------------------- 20

(2) Silica melt: Mol percent
$SiO_2$ --------------------------------------- 60
$^7Li_2O$ ------------------------------------- 30
BeO ----------------------------------------- 10

The molecular effective absorptional cross-sections amount to:

$\sigma a, {}^{11}B_2O_3 = 0.10$ barn $\sigma a, MgO = 0.0632$ barn $\sigma a, SiO_2 = 0.1304$ barn $\sigma a$, $^7\text{Li}_2\text{O} = 0.066$ barn $\sigma a$, $\text{BeO} = 0.012$ barn $\sigma a$, $\text{UO}_2 = 683\, N_{235}:N_\text{U} + 272\, (1 - N_{235}:N_\text{U})$ barn wherein $N_{235}$ is the amount of the $^{235}\text{U}$ atoms, and $N_\text{U}$ the amount of the $^{235}\text{U}$ and $^{238}\text{U}$ atoms. In case one takes further $\sigma f = 577$ as a basis for the effective fissional cross-section of the $^{235}\text{U}$ atom, and $\nu = 2.46$ as an average of the neutrons liberated per fission, the thermal increment $\eta \cdot f$ of the multiplication factor $k = \epsilon \cdot \eta \cdot f \cdot p$ can be calculated in a conventional manner.

For determining the resonance escape probability $p$, the molecular epithermal scattering cross-sections are needed. These amount to $\sigma s$, $^{11}\text{B}_2\text{O}_3 = 18.7$ barn $\sigma s$, $\text{MgO} = 7.2$ barn $\sigma s$, $\text{SiO}_2 = 9.7$ barn $\sigma s$, $^7\text{Li}_2\text{O} = 5.6$ barn $\sigma s$, $\text{BeO} = 9.8$ barn $\sigma s$, $\text{UO}_2 = 15.8$ barn The effective resonance integral is known numerically.

Figure 7:
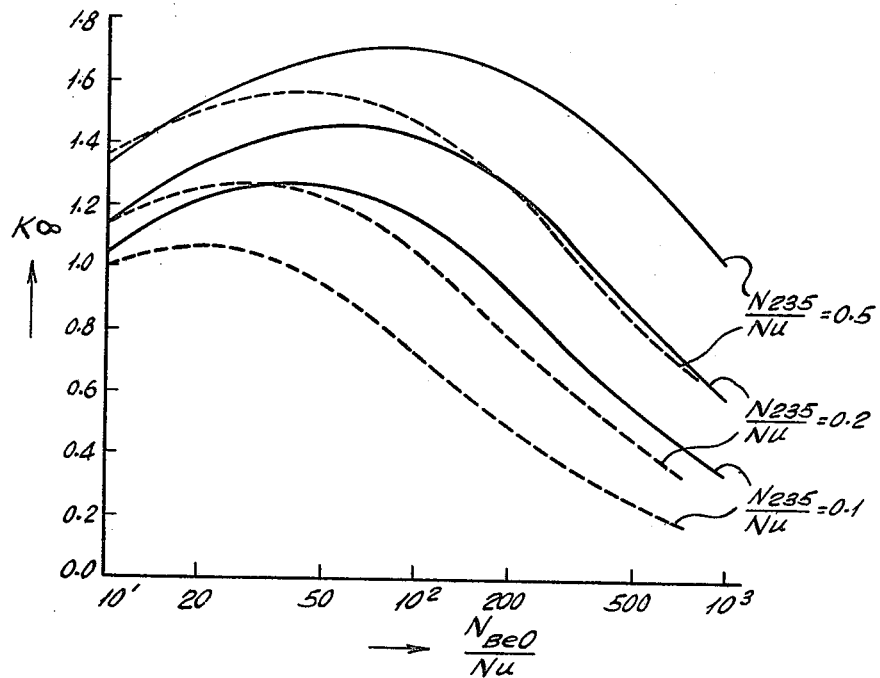
FIG. 7 is a diagram wherein are plotted values of the computed critical multiplication factor $k\infty$ against the ratio $N_{BeO}:N_U$, for three different enrichment or concentration values, and each for a borate melt (solid curves) and a silica melt (broken curves)
Figure 8:
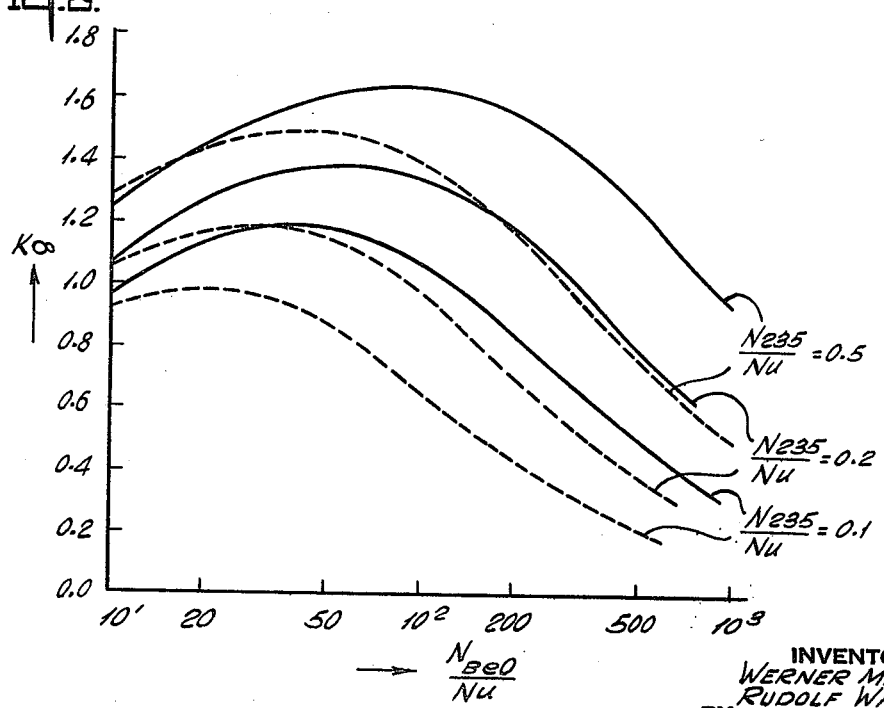
FIG. 8 is a diagram similar to FIG. 7 but computed for a temperature of 1500° C.

FIGS. 7 and 8 are diagrams wherein values of the computed critical multiplication factor $k\infty$ are plotted against the ratio $N_\text{BeO}:N_\text{U}$, for three different enrichment values, as will be explained hereinafter, for the above-named borate and silica melts, the former being shown in solid lines and the latter in broken lines. The enrichment values ($N_{235}:N_\text{U}$) are the following: 0.1, 0.2 and 0.5.

The diagram of FIG. 7 shows that $k\infty$ values of over unity can be achieved with relatively low fission-substance increments so that in systems of such kind a self-sustaining chain reaction can be released.

The fact that this is possible even at temperatures of over 1000° C. is shown in the diagram of FIG. 8 wherein the factor $k\infty$ is shown for the same borate and silicate glasses as above, in dependence of the ratio $N_\text{BeO}:N_\text{U}$, but for a temperature of 1500° C. The values corresponding to this temperature for the effective absorptional cross-sections are $\sigma a$, $^{11}\text{B}_2\text{O}_3 = 0.036$ barn $\sigma a$, $\text{MgO} = 0.023$ barn $\sigma a$, $\text{SiO}_2 = 0.047$ barn $\sigma a$, $^7\text{Li}_2\text{O} = 0.024$ barn $\sigma a$, $\text{BeO} = 0.0032$ barn $\sigma a$, $\text{UO}_2 = 218\, N_{235}:N_\text{U} + 101\, (1 - N_{235}:N_\text{U})$ barn An example of an alternative melt, viz. a mixture of metallic oxides, in which the fissionable material may be dissolved is:

| | Mol percent |
|---|---|
| BeO | 44.45 |
| $\text{Al}_2\text{O}_3$ | 11.1 |
| MgO | 44.45 |

Figure 9:
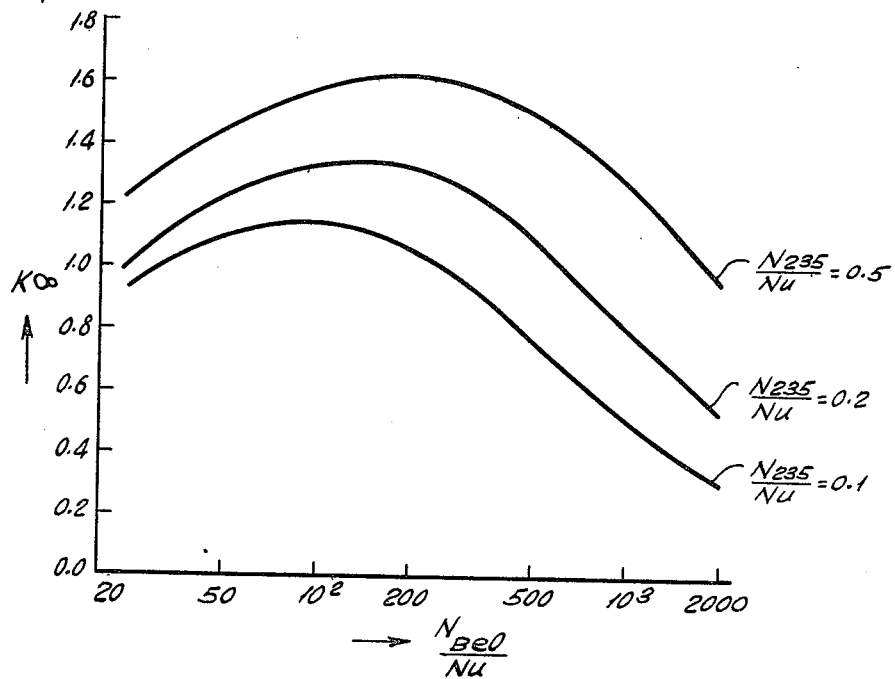
FIG. 9 is a similar diagram, for three concentration values, and for an exemplary mixture of metallic oxides at a melting point of 1640° C.
Figure 10:
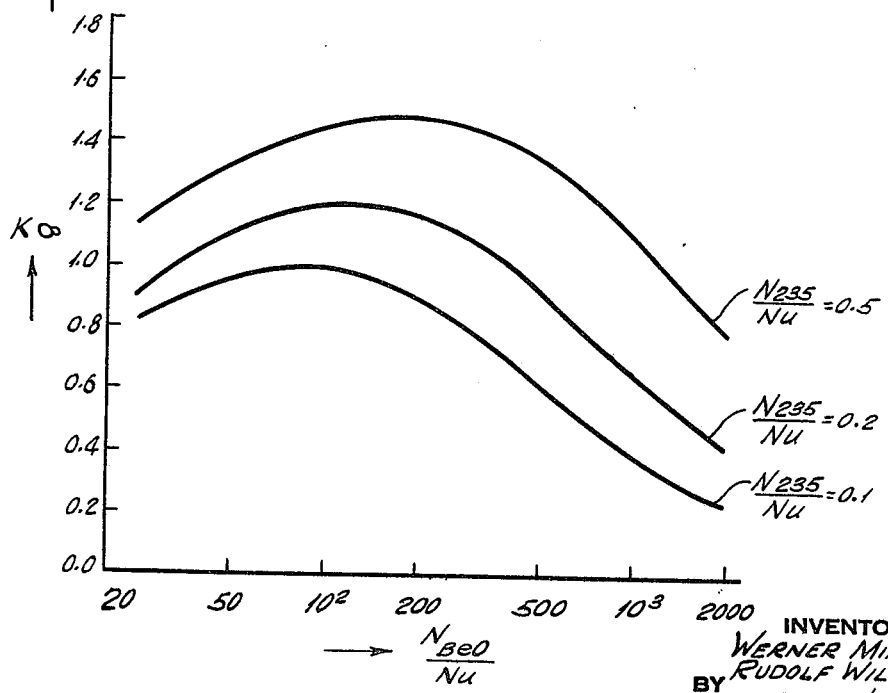
FIG. 10 is a diagram similar to FIG. 9 but computed for a temperature of 1900°C.

The molecular effective absorptional cross-sections amount to:

$\sigma a$, $\text{BeO} = 0.0102$ barn $\sigma a$, $\text{Al}_2\text{O}_3 = 0.46$ barn $\sigma a$, $\text{MgO} = 0.0632$ barn $\sigma a$, $\text{UO}_2 = 683 N_{235}:N + 2.72\, (1 - N_{235}:N_\text{U})$ barn while the molecular epithermal scattering cross-sections are:

$\sigma s$, $\text{BeO} = 9.8$ barn $\sigma s$, $\text{Al}_2\text{O}_3 = 14.1$ barn $\sigma s$, $\text{MgO} = 7.2$ barn $\sigma s$, $\text{UO}_2 = 15.8$ barn FIGS. 9 and 10 are diagrams wherein values similar those of FIGS. 7 and 8 are plotted for the above-named mixture of metallic oxides (shown in solid lines only).

The diagram of FIG. 9 shows respective factor values in dependence of the ratio $N_\text{BeO}:N_\text{U}$, as in FIGS. 7 and 8, similarly for the enrichment values of 0.1, 0.2 and 0.5, for a temperature of 1640° C.

It is shown in the diagram of FIG. 10 that in this system a self-sustaining chain reaction can be released even above 1640° C., this diagram showing values for 1900° C. The values of the effective absorptional cross-sections for this temperature are $\sigma a$, $\text{BeO} = 0.0029$ barn $\sigma a$, $\text{Al}_2\text{O}_3 = 0.149$ barn $\sigma a$, $\text{MgO} = 0.021$ barn $\sigma a$, $\text{UO}_2 = 166 N_{235}:N_\text{U} + 0.92\, (1 - N_{235}:N_\text{U})$ barn while the effective fissional cross-section amounts to $\sigma f = 136$ barn.

The heat-transfer data of the inventive reactor are given as follows: in case of a tank for holding the solution with a diameter of $2R = 4$ meters and a height of $H = 2$ meters, as well as with an interface temperature of the liquid solution of 2200° C., the heat streams through the free surface and the tank walls will each yield about 25 MW., in case of water cooling, that is a total of about 50 MW.

Upon increasing the tank diameter and maintaining a constant relation of $H:2R$, the amount of energy led off through radiation and combined conduction—convection will remain within the same proportion if all other conditions are the same. This means that 50% of the heat generated will be derived through the free contact surfaces whereas the other 50% will be available through the solid adjoining surfaces.

In the following, the structural details of the inventive reactor will be explained in connection with FIGS. 1-6 of the drawing.

Figure 1:
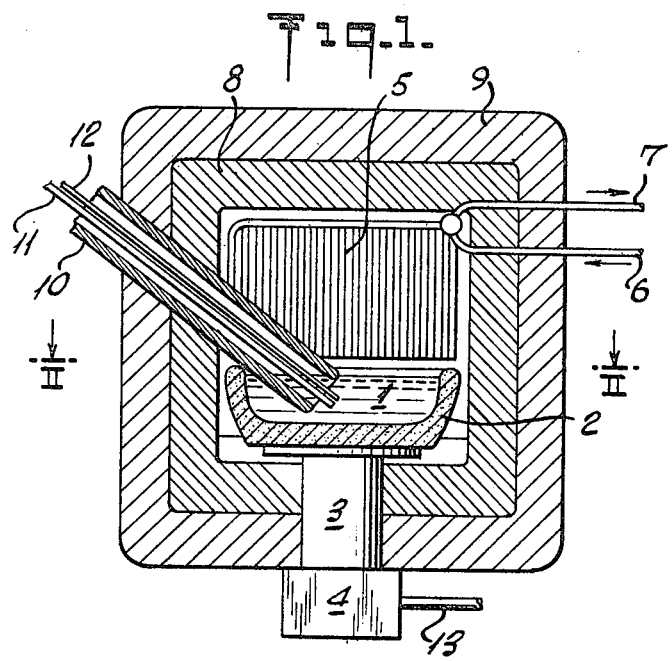
FIG. 1 is a longitudinal sectional view through one embodiment of the nuclear fission reactor according to the invention.
Figure 2:
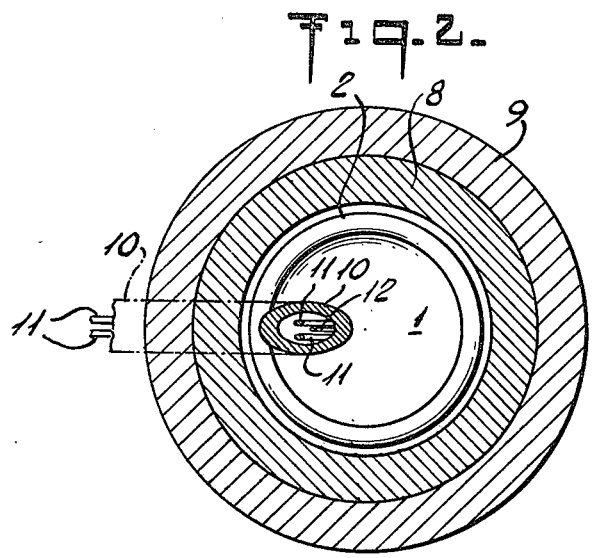
FIG. 2 is a cross-sectional view taken along line II—II of FIG. 1.

In the reactor embodiment shown in FIGS. 1 and 2, the heat of a diathermanous substance, e.g. and oxyceramic melt, denoted 1, is substantially transferred by radiation to a heat-exchanger or evaporator 5. The reactor core contains the melt 1 in which the fissionable material, e.g. uranium oxide, and the moderator, e.g. beryllium oxide, are present in solution. The fluid mass 1 is contained in a graphite crucible 2 serving at the same time as a neutron reflector. The crucible 2 is horizontally disposed within the reactor and has a vertical columnar support 3 which protrudes outside reflector 8 and radiation shield 9 of the reactor. The crucible 2 may be rotated around the vertical axis represented by the support 3. Outside the radiation shield 9, a gearing 4 is disposed for rotating the support at low speed, e.g., at one revolution per hour, by means of a drive (not shown) attached to the input shaft 13. However, the rotational speed of the crucible 2 can also be chosen higher.

The depth of the oxyceramic melt 1 is preferably chosen in such a manner that the open surface of the melt possesses heat-radiation characteristics of a black body. This is the case with a depth of melt of, for example, from 500 mm. to 1000 mm. For a homogeneous melt comprising 1.1% by weight $\text{UO}_2$ containing 20% $^{235}\text{U}$, 27.5% by weight BeO, 27.9% by weight $\text{Al}_2\text{O}_3$, and 43.5% by weight MgO the volume of the critical mass is e.g. a circular cylinder of 1.5 meters in height with a diameter of 1.6 meters. For the other types of core-melts, based upon borate or silica melts, which are given in the examples, similarly containing 1.1% by weight $\text{UO}_2$ with an enrichment of 20% of $^{235}\text{U}$ the same dimensions are valid. With a safety margin for surplus reactivity the resulting cylinder diameter would be an even 2 meters with a volume of 4 to 4.5 cubic meters.

Above the melt 1, the elements of the heat-exchanger or evaporation system 5 are arranged in the form of a wall formed of tubes, as illustrated in FIG. 1. It is understood, however, that the heat exchanger may comprise tubes, an array of plates or other members known for this purpose. The feed-in and discharge of the heat-carried medium is effected through respective pipe lines 6 and 7. In a conventional manner, water, gases, molten metals, such as sodium, or other suitable media may be used as carriers. The heat-exchanger system can also be provided in the form of a high-pressure stream boiler.

The entire inner space of the reactor with the core, that is the crucible 2 and the melt 1, as well as the heat-exchanger system 5 are surrounded by the reflector 8 and the shield 9, as mentioned before. A fixed member, exemplified in this embodiment by a tube 10, passes through one side of the shield into the reactor so that its lower extremity is immersed in the oxyceramic melt 1. This tube acts as a stirrer in the rotating melt, enhancing the effect of equalizing thermal flow in the melt. Regulating and safety rods 11 can be introduced through tube 10 into the reactor and the melt.

The removal of used material and introduction of fresh reactive mass can also be effected through tube 10. A pipe 12 of a smaller diameter can be introduced through pipe 10 and into the molten mass, and liquid mass can be either fed in or drawn off through this pipe. Or, alternately, a double pipe or one with a circulating cooling medium (not shown) can be led into the melt by way of tube 10 so that portions of the oxyceramic melt in the vicinity of the immersed pipe may be cooled to a temperature below the melting point of the mixture. The frozen portions can thus be removed from the reactor in a solid state by means of a double pipe or other conventional means. This "freezing" method of removal of the used mass has the advantage that gaseous fission products are trapped inside the mass and cannot escape during the removal process.

It will be clear to those skilled in the art that the above-described first reactor embodiment, although discussed in connection with the use of an oxyceramic melt, may of course be realized and operated with the other alternative fully described in the earlier part of the specification, that is, with a diathermanous mixture other than glass and containing metal oxides or carbides. With the structural details of the reactor of FIGS. 1 and 2 left substantially unaltered, the melt 1 may comprise the metal-oxide mixtures described hereinabove, which may be liquid in the proximity of the crucible wall, or alternately undergoing a solidification process from a liquid state in the center to a solid state toward the outer crucible peripheries.

Another embodiment of a nuclear fission reactor based on the present invention is shown in FIGS. 3 and 4. In this reactor heat is removed not only by radiation but also by convection. The reactor core is provided with a graphite crucible 22 serving as a container for the melt 21 which contains fissionable material and moderator, and also as a neutron reflector. Above the core, a heat-radiation chamber 23 is provided, the walls of which are formed from tightly adjoining vertical tubes 24 in the manner of combustion chambers of high-pressure steam boilers. The tubes may form a continuous serpentine of upward and downward running sections. This heat-exchanger system can work as a steam boiler on the principle of a vertical-tube boiler, or a so-called Benzon boiler. In the latter case, superheaters 25 are built into a shaft 26 which is connected with heat-radiation chamber 23 through openings 27 of wall 45.

Shaft 26 and chamber 23 together form the heat-exchanger or evaporation-system chamber. A steam collector 28 of this system has an inlet and an outlet pipe line leading to the outside, schematically shown at 29 and 30, respectively, for the heat-carrier medium which can be water, for example. The heat-exchanger elements in the chamber 23 and the shaft 26 may also be constructed as to permit the use of gas or liquid metals as heat-carrier media.

In the lower part of shaft 26 a suction chamber 46 is provided in which two turbo-blowers 31, 31' are disposed. The intake ducts 47, 47' (FIG. 4) are connected with the spaces 26, 23 occupied by the heat-exchanger or evaporation system by way of the suction chamber 46. On their delivery sides the blowers 31, 32' are connected with a space 32 arranged below the bottom of crucible 22 of the reactor core. The space of crucible 22 is connected with the space 32 by means of a plurality of evenly spaced openings 33 which may have the form of nozzles. With the aid of blowers 31, 31' and through this perforated crucible bottom, gas is being blown through the melt and led in a closed circuit through the reactor core and the heat-exchanger or evaporation-system chamber. Carbon dioxide, air, helium or other suitable gases can be used for this purpose.

The plurality of openings 33 and the stirring action performed by gas bubbles rising in the melt favor the formation of extensive contact surfaces between the gas and the heat-radiating melt so that a thorough convective heat exchange is achieved. After leaving the melt, the gas, as mentioned, flows through the chamber 23 and shaft 26 in which the superheater 25 is disposed. In this way the heat is transferred to the medium flowing through the system 25. Subsequently the gas returns to the suction chamber 46 of turbo-blowers 31, 31'.

The reactor core, the chamber 23, and the shaft 26 with superheater 25 and suction chamber 46 are surrounded by an inner radiation shield 34. A gravity tube 35 passes through this shield and leads downward from the deepest point of crucible 22 of the reactor core. The tube 35 is provided with a valve stopper 36 with which it may be opened and closed. A servomechanism 37 is provided for the operation of stopper 36. Through the tube 35 part of the melt can be drawn off from time to time. The tube leads to a water bath 38 in which the downflowing melt solidifies into a granular substance and can subsequently be removed in this form with the aid of a screw conveyor 39 or some other conventional device provided at the bottom of the water bath. In this way part of the melt containing the fissionable material in solution can be constantly taken up or removed to be processed.

A duct 40 is provided for the supply of fresh fissionable material; this duct penetrates an outside radiation shield 43 and empties into the reactor core space immediately above the melt 21. Below the duct 40 another duct 41 is provided which permits the introduction of regulating and safety rods 42 into the reactor core.

The outer casing 43, representing the outer radiation shield, surrounds the inner shield 34. The casing 43 encloses the drive means or servomechanism 37 for the valve stopper 36 of tube 35, as well as drive means 44, 44' (FIG. 4) for the turbo-blowers 31, 31' disposed outside the inner radiation shield 34.

It will, this time again, be clear to those skilled in the art that the above-described second reactor embodiment, too, can be operated both with oxyceramic melts and with diathermanous mixtures or melts of metallic oxides. All the alternative features described hereinabove are considered to be operative and within the scope of combination with the second reactor embodiment.

FIGS. 5 and 6 illustrate a third embodiment of the novel reactor in which the melt is designated 51, and the reactor core is shown this time as having a cylindrical container 52 with a rectangular outline having rounded-off corners. It will be understood that other shapes may also be chosen if dictated by reasons of nuclear physics or because of production considerations. In front of the reactor core casing, an open bed 81 is disposed in which the liquid mass 51 has an open surface.

By means of part of the gas stream which is allowed to escape upward through a pipeline 78 from a gas collecting chamber 62, liquid fissionable material is pumped into two dome-shaped attachments 79, 79′ on the reactor casing. The return flow to the reactor core occurs with an open surface by way of ducts 80, 80′. The bottom of the open bed 81 has openings 63 for the passage of gas from chamber 62 into a heat-radiation chamber 53 of the steam-generating equipment. The chamber 53 contains walls formed of tightly adjoining vertical tubes 54 in the manner of radiation boilers. The chamber 53 has only two lateral overflow openings 58 through which the circulating gas streams downward again by way of side chambers 59, 59′, outside the chamber 53.

A gas circulating blower 61 with its drive means 74, disposed outside the radiation shield, conveys the gas through flat channel 82 and back into the gas collecting pressure chamber 62. A regulating device 83 is arranged above the reactor space for inserting and removing regulating rods. A tube 65, provided with regulating and control devices, leads downwards from the reactor container 52 at its deepest point. Fissionable material may be discharged through this tube. Fresh fissionable material can be introduced through a side opening 70 into the melt bath of the reactor.

The reactor core, the steam-generating equipment as well as the regulating and control devices, together with the blower, are housed in a pressure-proof steel vessel 73. The conventional outer shielding means surrounding the vessel are not shown for the sake of clarity and simplification.

The remarks made in connection with the previous reactor embodiments also apply to the third one. All types of diathermanous mixtures, including those consisting of an oxyceramic melt, may advantageously be used in the reactor. All additional and alternative features described in the previous sections of the specification can optionally be applied to the third reactor embodiment as well.

It should be understood that the foregoing disclosure relates only to preferred embodiments of the invention and that it is intended to cover all changes and modifications of the examples described which do not constitute departures from the spirit and scope of the invention as set forth in the appended claims.

What we claim is:

1. In a homogeneous, thermal nuclear fission reactor, a core constituted of a diathermanous molten liquid solution comprising a melt selected from the group consisting of oxyceramic substances forming a glass in congealed condition and mixtures of metallic oxide substances having dissolved therein a fissionable material and a moderator substances therefor.

2. In a reactor according to claim 1, in which said moderator substance consists of beryllium oxide and said fissionable materials consists of uranium dioxide containing the isotope $^{235}U_{92}$.

3. In a reactor according to claim 2, in which said melt is constituted of a mixture of $Al_2O_3$ and $MgO$.

4. In a reactor according to claim 2, in which said melt is constituted of a mixture of $^{11}B_2O_3$ and $MgO$.

5. In a reactor according to claim 2, in which said melt is constituted of a mixture of $SiO_2$ and $^7Li_2O$.

6. In a reactor according to claim 1, in which the configuration of said core, constituting a critical mass, is a cylinder having a diameter of 1.6 meters and a height of 1.5 meters.

7. In a reactor according to claim 1, in which the configuration of said core, constituting a critical mass and a safety margin for surplus reactivity, is a cylinder having a diameter of 2 meters and a volume of 4 to 4.5 cubic meters.

8. In a reactor according to claim 3, in which the relative proportions of the BeO, $Al_2O_3$ and MgO are respectively 44.45 mol percent, 11.1 mol percent and 44.45 mol percent and the proportion of said uranium dioxide relative to the total of said BeO, $Al_2O_3$ and MgO is 0.5 to 3 percent.

9. In a reactor according to claim 4, in which the relative proportions of the BeO, $^{11}B_2O_3$ and MgO are 20 mol percent, 45 mol percent and 35 mol percent.

10. In a reactor according to claim 5, in which the relative proportions of the BeO, $SiO_2$ and $^7Li_2O$ are 10 mol percent, 60 mol percent and 30 mol percent.

References Cited

UNITED STATES PATENTS

| | | | |
|---|---|---|---|
| 3,141,852 | 7/1964 | Dressler et al. | 176—89 |
| 3,150,099 | 9/1964 | Pons | 176—89 |

FOREIGN PATENTS

| | | |
|---|---|---|
| 222,587 | 11/1958 | Australia. |
| 1,033,807 | 7/1958 | Germany. |
| 1,114,262 | 9/1961 | Germany. |
| 757,015 | 9/1956 | Great Britain. |
| 861,602 | 2/1961 | Great Britain. |

BENJAMIN R. PADGETT, Primary Examiner

HARVEY E. BEHREND, Assistant Examiner

U.S. Cl. X.R.

176—49, 89